US 12,480,826 B2

(12) United States Patent
Adelson (10) Patent No.: US 12,480,826 B2
(45) Date of Patent: *Nov. 25, 2025

(54) RETROGRAPHIC SENSORS WITH FLUORESCENT ILLUMINATION

(71) Applicant: Massachusetts Institute of Technology, Cambridge, MA (US)

(72) Inventor: Edward Adelson, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 201 days.

This patent is subject to a terminal disclaimer.

(21) Appl. No.: 18/267,032

(22) PCT Filed: Oct. 14, 2021

(86) PCT No.: PCT/US2021/054974
§ 371 (c)(1),
(2) Date: Jun. 13, 2023

(87) PCT Pub. No.: WO2022/132300
PCT Pub. Date: Jun. 23, 2022

(65) Prior Publication Data
US 2024/0060837 A1    Feb. 22, 2024

Related U.S. Application Data

(60) Provisional application No. 63/125,676, filed on Dec. 15, 2020.

(51) Int. Cl.
*G01L 1/24* (2006.01)
*B25J 13/08* (2006.01)
(Continued)

(52) U.S. Cl.
CPC ............. *G01L 1/241* (2013.01); *B25J 13/084* (2013.01); *G01L 5/166* (2013.01); *G01L 5/226* (2013.01);
(Continued)

(58) Field of Classification Search
CPC ......... G01L 1/241; G01L 5/166; G01L 5/226; G01L 5/228; B25J 13/084; B25J 19/021;
(Continued)

(56) References Cited

U.S. PATENT DOCUMENTS

| 8,411,140 B2 | 4/2013 | Adelson |
| 9,127,938 B2 | 9/2015 | Adelson et al. |

(Continued)

FOREIGN PATENT DOCUMENTS

| WO | WO-2020051458 A1 * | 3/2020 | ............... G01B 1/00 |
| WO | WO 2021/076697 A1 | 4/2021 | |

OTHER PUBLICATIONS

International Search Report and Written Opinion for International Application No. PCT/US2021/054974 dated Jun. 16, 2022.
(Continued)

*Primary Examiner* — Dominic J Bologna
(74) *Attorney, Agent, or Firm* — Wolf, Greenfield & Sacks, P.C.

(57) ABSTRACT

A retrographic sensor includes a transparent structure, a transparent elastomeric pad, and an at least partially reflective layer. One or more excitation light sources emit light toward a side surface of the transparent structure. The side surface may include a fluorescent layer, where the light from the one or more excitation light sources excites fluorescent emissions from the fluorescent layer. The fluorescent emissions may illuminate the at least partially reflective layer.

20 Claims, 6 Drawing Sheets

(51) Int. Cl.
*B25J 19/02* (2006.01)
*G01L 5/166* (2020.01)
*G01L 5/22* (2006.01)
*H03K 17/94* (2006.01)

(52) U.S. Cl.
CPC ............ *G01L 5/228* (2013.01); *H03K 17/941* (2013.01); *B25J 19/021* (2013.01); *H03K 2217/94108* (2013.01); *H03K 2217/94116* (2013.01)

(58) Field of Classification Search
CPC ....... H03K 17/941; H03K 2217/94108; H03K 2217/94116
See application file for complete search history.

(56) References Cited

U.S. PATENT DOCUMENTS

| | | | |
|---|---|---|---|
| 9,538,056 B2 | 1/2017 | Adelson et al. | |
| 9,815,198 B2 | 11/2017 | Davis | |
| 10,038,854 B1 | 7/2018 | Cooper et al. | |
| 10,574,944 B2 | 2/2020 | Adelson et al. | |
| 12,135,254 B2 * | 11/2024 | Adelson | G01L 5/0061 |
| 2003/0178556 A1 * | 9/2003 | Tachi | G06F 3/042 |
| | | | 250/208.1 |
| 2006/0256331 A1 * | 11/2006 | Lakowicz | G01N 21/648 |
| | | | 356/417 |
| 2009/0315989 A1 * | 12/2009 | Adelson | G06F 3/042 |
| | | | 348/135 |
| 2013/0033595 A1 | 2/2013 | Adelson et al. | |
| 2014/0104395 A1 * | 4/2014 | Rohaly | G01B 11/245 |
| | | | 348/47 |
| 2016/0044218 A1 * | 2/2016 | Adelson | G01B 11/303 |
| | | | 348/128 |
| 2016/0171746 A1 * | 6/2016 | Lilien | G01B 11/24 |
| | | | 348/46 |
| 2020/0246980 A1 | 8/2020 | Kuppuswamy et al. | |
| 2020/0355619 A1 | 11/2020 | Haynes | |

OTHER PUBLICATIONS

International Preliminary Report on Patentability (Chapter 1) for International Application No. PCT/US2021/054974 dated Jun. 29, 2023.

Hashizume et al., Capacitive sensing for a gripper with gecko-inspired adhesive film. IEEE Robot Automat Lett. Jan. 2019; pp. (99): 1-7.

Johnson et al., Retrographic sensing for the measurement of surface texture and shape. Proc CVPR. IEEE Comp Soc Conf Comp Vision Patt Recog. 2009: 8 pages. doi: 10.1109/CVPR.2009.5206534.

Patel et al., Digger Finger: GelSight Tactile Sensor for Object Identification Inside Granular Media. ISER. Mar. 28, 2021;17:105-15.

Raj et al., An interactive "retrographic sensor" for touch, texture, and shape. ACM SIGGRAPH 2009 Emerg Tech. Aug. 3, 2009;15:1. doi: 10.1145/1597956.1597971.

Yuan et al., GelSight: high-resolution robot tactile sensors for estimating geometry and force. Sensors. 2017; 17(12): 2762.

* cited by examiner

RETROGRAPHIC SENSORS WITH FLUORESCENT ILLUMINATION

RELATED APPLICATIONS

This application is a national stage filing under 35 U.S.C. § 371 of International application serial number PCT/US2021/054974, filed Oct. 14, 2021, which claims the benefit of priority under 35 U.S.C. § 119 (e) of U.S. provisional application Ser. No. 63/125,676, filed Dec. 15, 2020, the disclosure of each of which is incorporated herein by reference in its entirety.

GOVERNMENT LICENSE RIGHTS

This invention was made with Government support under N00014-18-1-2815 awarded by the Office of Naval Research. The Government has certain rights in the invention.

FIELD

Disclosed embodiments are related to retrographic sensors and related methods of use.

BACKGROUND

The sense of touch contributes to the dexterity of human manipulation, especially in cases where high precision is desirable. The complex ensemble of mechanoreceptors in the human hand provides extremely rich tactile sensory signals. These sensory signals encode information such as contact force and contact shape and such signals can be used to detect complex state transitions such as making or breaking contact or the occurrence of slippage between the finger and the grasped object.

Vision based tactile sensors have become employed with robotic systems due to their high signal resolutions and the softness of their sensing surfaces. The softness of the sensing surface allows for larger contact regions as it deforms to conform with the object surface. The resulting contact areas are then characterized in great detail via the high-resolution signals. Together, these properties have enabled the use of these sensors in tackling several tasks such as assessing grasp success, servoing object surfaces, detecting slip and shear force, reconstructing three-dimensional surfaces, and distinguishing between different cloth materials. However, conventional sensors are constrained to flat or nearly flat designs.

SUMMARY

In some embodiments, a retrographic sensor includes a transparent structure including an interior surface, an exterior surface, and one or more side surfaces extending between the interior surface and the exterior surface, a transparent elastomeric pad disposed on the exterior surface of the transparent structure, an at least partially reflective layer disposed on the transparent elastomeric pad such that the transparent elastomeric pad is disposed between the at least partially reflective layer and the transparent structure, and a first fluorescent layer disposed on at least a first side surface of the one or more side surfaces, wherein the first fluorescent layer is configured to emit first fluorescent light into the transparent structure. In some embodiments, the retrographic sensor further includes one or more excitation light sources configured to direct excitation light onto the first fluorescent layer to cause the first fluorescent layer to emit the first fluorescent light. In some embodiments, the retrographic sensor further includes a photosensitive detector oriented toward the interior surface of the transparent structure. In some embodiments, the fluorescent layer may include fluorescent paint.

In some embodiments, a retrographic sensor includes a transparent structure including an interior surface, an exterior surface, a first side surface extending between the interior surface and the exterior surface, and a second side surface extending between the interior surface and the exterior surface. The retrographic sensor also includes a transparent elastomeric pad disposed on the exterior surface of the transparent structure, a first fluorescent layer disposed on the first side surface, wherein the first fluorescent layer is configured to emit a first fluorescent light in a first emission wavelength band into the transparent structure, and a second fluorescent layer disposed on the second side surface. The second fluorescent layer is configured to emit a second fluorescent light in a second emission wavelength band into the transparent structure, the first fluorescent layer is configured to absorb the second fluorescent light that is incident on the first fluorescent layer, and the second fluorescent layer is configured to absorb the first fluorescent light that is incident on the second fluorescent layer.

In some embodiments, a method of operating a retrographic sensor includes illuminating a fluorescent layer disposed on a side surface of a transparent structure with an excitation light source, emitting a first fluorescent light from the fluorescent layer into the transparent structure toward a transparent elastomeric pad disposed on an exterior surface of the transparent structure, reflecting the first fluorescent light off of an exterior surface of the elastomeric pad toward an interior surface of the transparent structure, and receiving light reflected from the exterior surface of the elastomeric pad at a photosensitive detector.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Conventional vision based tactile sensors, including retrographic sensors, provide high resolution signals which allow an object or surface in contact with the tactile sensor to be characterized in detail. However, conventional vision based tactile sensors are often constrained to flat or nearly flat designs. This flat geometry is a result of difficulties associated with providing well controlled directional lighting in non-planar geometries. Accordingly, conventional retrographic sensors are bulky and not able to be packaged for use in smaller robotic systems.

In view of the above, the inventors have recognized the benefits of a retrographic sensor including one or more fluorescent layers configured to provide fluorescent illumination of an at least partially reflective layer. The one or more fluorescent layers may replace large arrays of light sources, diffusers, and/or filters with a thin fluorescent layer. Accordingly, the one or more reflective layers may provide simple, inexpensive, and compact illumination for a retrographic sensor. As will be discussed further herein, one or more fluorescent layers may provide non-directional, diffuse illumination for a retrographic sensor. Additionally, in some embodiments, one or more fluorescent layers may function to absorb light not sourced from the fluorescent layer itself, which may reduce nuisance illumination. In some embodiments, multiple fluorescent layers may be employed that fluoresce different wavelengths of light. As will be discussed further below, such an arrangement may allow a retrographic sensor to employ photometric stereo in a relatively compact form factor compared with conventional retrographic sensors.

In some embodiments, a retrographic sensor includes a transparent structure including an interior surface, an exterior surface, and one or more side surfaces. The transparent structure may be rigid and may be transparent to one or more wavelength bands of light. In some embodiments, the transparent structure may be formed as a rectangular block (e.g., a rectangular prism). In other embodiments, the transparent structure may be semi-spherical, quarter-spherical, formed as any portion of a sphere or cylinder, or formed as another curved structure (such as an S-shaped structure), though other curved shapes are also contemplated. The retrographic sensor may also include a transparent elastomeric pad disposed on the exterior surface of the transparent structure. The elastomeric pad may be compliant, such that the elastomeric pad deforms when the elastomeric pad contacts an object. The retrographic sensor may also include an at least partially reflective layer disposed on the transparent elastomeric pad such that the transparent elastomeric pad is disposed between the at least partially reflective layer and the transparent structure. According to this arrangement, when the elastomeric pad is deformed, the at least partially reflective layer may also deform. In some embodiments, the at least partially reflective layer may be Lambertian (e.g., matte). Such an arrangement may be employed for a transparent structure formed as a rectangular block. In other embodiments, the at least partially reflective layer may be a semi-specular layer, examples of which will be discussed further below. A semi-specular membrane may be specular, in that an angle of incidence is similar to an angle of reflection, but the reflection has a wide specular lobe. Such an arrangement may be employed with a transparent structure having a curved exterior surface. The retrographic sensor may also include a first fluorescent layer disposed on at least a first side surface of the one or more side surfaces of the transparent structure. The first fluorescent layer may be configured to emit first fluorescent light when excited by light from one or more excitation light sources. The first fluorescent light from the first fluorescent layer is configured to illuminate the at least partially reflective layer. In some embodiments, the fluorescent layer may include fluorescent paint.

In some embodiments, a retrographic sensor may include one or more excitation light sources configured to emit light onto one or more fluorescent layers to excite fluorescent light emissions from the one or more fluorescent layers. One or more excitation light sources may emit any suitable wavelength of light that excites the one or more fluorescent layers. In some embodiments, one or more excitation light sources may emit light having a wavelength greater than or equal to 200 nm, 280 nm, 315 nm, 380 nm, and/or any other suitable wavelength. Correspondingly, one or more excitation light sources may emit light having a wavelength less than or equal to 500 nm, 490 nm, 450 nm, 400 nm, 315 nm, 280 nm, and/or any other suitable wavelength. Combinations of these values are contemplated, including wavelengths between 200 nm and 500 nm (spanning ultraviolet to the color blue), 200 nm and 380 nm (corresponding to ultraviolet), 315 nm and 400 nm (corresponding to ultraviolet A), 380 nm and 490 nm (spanning the colors violet to blue), as well as 450 nm and 490 nm (corresponding to the color blue). In some embodiments, the one or more excitation light sources may be configured to emit short-wave light. Of course, one or more excitation light sources may emit any suitable wavelength configured to excite fluorescent emissions from one or more fluorescent layers, as the present disclosure is not so limited. According to exemplary embodiments described herein, an excitation light source may include one or more LEDs, incandescent bulbs, compact fluorescent (CFL) bulbs, or any other suitable light source, as the present disclosure is not so limited.

In some embodiments, a method of operating a retrographic sensor includes illuminating a fluorescent layer disposed on a side surface of a transparent structure with an excitation light source to excite fluorescence of the fluorescent layer. In some embodiments, the excitation light source may be configured to emit excitation light having a dominant wavelength between 200 and 500 nm. As used herein, a dominant wavelength is the wavelength of peak intensity in a wavelength band. The excitation light source may include one or more light sources which illuminate an interior surface of the fluorescent layer or an exterior surface of the fluorescent layer. The method may also include emitting a first fluorescent light into the transparent structure toward a transparent elastomeric pad disposed on an exterior surface of the transparent structure. The first florescent light may be diffused by the fluorescent layer, such that a portion of the fluorescent light emitted is directed toward the elastomeric pad. The method may also include reflecting the first fluorescent light off of an exterior surface of the elastomeric pad toward an interior surface of the transparent structure. In some embodiments, this reflection may be a reflection off an at least partially reflective (e.g., semi-specular, matte) layer disposed on the exterior surface of the elastomeric pad. The light reflected from the elastomeric pad may be received at a photosensitive detector physically and/or visually oriented toward to the interior surface of the transparent structure. In some embodiments, the excitation light source may excite fluorescence of a second fluorescent layer disposed on a second side surface of the transparent structure such that the second fluorescent layer emits a second fluorescent light toward the elastomeric pad. In such an embodiment, a wavelength band of the first fluorescent light and a wavelength band of the second fluorescent light may be substantially non-overlapping, such that the dominant wavelength of the first fluorescent light and second fluorescent light are different from one another. In some embodiments, the second side surface may be at least partially opposing the first side surface, such that the first fluorescent light and second fluorescent light are emitted in directions which intersect one another. Such an arrangement may allow photometric stereo to be employed at the photosensitive detector.

In some embodiments, one or more excitation light sources may excite multiple fluorescent layers configured to emit fluorescent light in different wavelength bands. According to these embodiments, a single type of excitation light source emitting a single wavelength band of light may be employed to excite fluorescence in multiple fluorescent layers to illuminate an at least partially reflective layer of a retrographic sensor with light of different wavelength bands (which may correspond to different colors). In other embodiments, multiple excitation light sources of different types may excite multiple fluorescent layers of different types. According to these embodiments, a first excitation light source may emit light in a first wavelength band which is configured to excite a first fluorescent layer that then emits fluorescent light in a first fluorescent wavelength band. A second excitation light source may emit light in a second wavelength band which is configured to excite a second fluorescent layer than then emits fluorescent light in a second fluorescent wavelength band. The first wavelength band and the second wavelength band may be different, such that the different fluorescent layers may be independently excited. Likewise, the first fluorescent wavelength band and second fluorescent wavelength band may be different so as to provide different wavelengths of light illuminating a transparent structure. In some embodiments, a first dominant fluorescent wavelength may be different than a second dominant fluorescent wavelength. According to such an embodiment, the first fluorescent wavelength band and second fluorescent wavelength band may partially overlap, but the dominant or peak wavelengths may be different from one another. Of course, wavelength bands of light from multiple light sources and/or fluorescent layers may overlap or be the same or substantially the same, as the present disclosure is not so limited.

As used herein, two wavelengths bands may be substantially non-overlapping when light emitted by a first source (e.g., an excitation light source) and a second source (e.g., a second excitation light source and/or a fluorescent layer or surface) are primarily emitted at different wavelengths. For example, a majority of the light emitted by the first source may be in a wavelength band that is different from the wavelength band where a majority of the light is emitted by the second source. However, due to excitation light sources and fluorescent light emissions typically being emitted over a broad range of wavelengths with different intensities, there is likely to be some small amount of light emissions at wavelengths associated with another wavelength band. However, emissions from an excitation light source and/or fluorescent surface outside of the associated wavelength bands may have intensities that are significantly less than an intensity of light emitted at wavelengths within the wavelength band of that source. For example, intensities of light emitted from a source at wavelengths outside of a wavelength band may be 5% or less than a peak intensity of wavelengths emitted from the source within the wavelength band.

According to exemplary embodiments described herein, one or more fluorescent layers of a retrographic sensor may be excited from either an exterior surface of the one or more fluorescent layers or an interior surface of the one or more fluorescent layers. An exterior surface of the one or more fluorescent layers may face outward from a transparent structure on which the one or more fluorescent layers are disposed. An interior surface of the one or more fluorescent layers may face inward into a transparent structure on which the one or more fluorescent layers are disposed. In some embodiments, one or more excitation light sources may emit light toward the exterior surface of the one or more fluorescent layers. In such an embodiment, the one or more fluorescent layers may be excited and emit fluorescent light into the transparent structure. In other embodiments, one or more excitation light sources may emit light toward the interior surface of the one or more fluorescent layers. For example, one or more excitation light sources may emit light directly incident on the interior surface of the one or more fluorescent layers. As another example, one or more excitation light sources may emit light into the transparent structure where it undergoes internal reflection until the light encounters the one or more fluorescent layers. Once exciting light encounters the one or more fluorescent layers, the one or more fluorescent layers may be excited and emit fluorescent light into the transparent structure. Accordingly, the retrographic sensor according to exemplary embodiments described herein may be illuminated by one or more excitation light sources from an exterior or interior of the retrographic sensor.

In some cases, the one or more excitation light sources and/or fluorescent layers of a retrographic sensor may emit light that excites auto-fluorescence in one or more components of a system. That is, in some cases, materials that would otherwise be appropriate for illumination under light in visual wavelength bands, may be excited and fluoresce when exposed to light that excites the one or more fluorescent layers. When the transparent structure and/or elastomeric pad of a retrographic sensor fluoresce, the light from these sources may be nuisance illumination and such illumination may impair the ability of the retrographic sensor to sense surface profiles when the elastomeric pad is deformed. Accordingly, the inventors have appreciated a retrographic sensor employing materials that do not fluoresce under illumination from the one or more excitation light sources, or at least fluoresce by a substantially reduced amount relative to the intensity of fluorescence from the fluorescent layers of the device. In particular, in some embodiments, the inventors have appreciated a retrographic sensor employing materials that emit fluorescent light having an intensity at least an order of magnitude less than fluorescent light from one or more fluorescent layers when illuminated by electromagnetic radiation from the one or more excitation light sources. In some embodiments, a retrographic sensor may employ materials that emit fluorescent light at least two orders of magnitude less than fluorescent light from one or more fluorescent layers when illuminated by electromagnetic radiation from the one or more excitation light sources. Of course, any suitable order of magnitude difference in the intensity of light emitted from components of the retrographic sensor and one or more fluorescent layers may be employed, as the present disclosure is not so limited. In some embodiments, retrographic sensor may employ materials that emit fluorescent light an intensity less than 1% of an intensity of fluorescent light from one or more fluorescent layers when illuminated by electromagnetic radiation from the one or more excitation light sources.

In some embodiments, a transparent structure of a retrographic sensor may be formed of acrylic or glass. Of course, any suitable material may be employed for a transparent structure, as the present disclosure is not so limited. In some embodiments, an elastomeric pad of a retrographic sensor may be formed of silicone rubber, Polydimethylsiloxane (PDMS), thermoplastic elastomer (TPE), or polyurethane. Of course, any suitable material may be employed for an elastomeric pad, as the present disclosure is not so limited. In some embodiments, an at least partially reflective layer may be formed of aluminum powder deposited in a layer. In some embodiments, the aluminum powder may be formed of round or amorphous particulates, so as to provide a Lambertian surface. In some embodiments, the aluminum particles may have diameter between 10 nm and 10 microns. In some embodiments, the aluminum particles may have a diameter between 0.5 microns and 2 microns. Of course, any suitable material for an at least partially reflective layer may be employed, as the present disclosure is not so limited. In some embodiments, each of the materials listed above may not substantially fluoresce compared to fluorescence of one or more fluorescent layers.

In some conventional retrographic sensors, when the light from an excitation light source enters the transparent structure, it may be refracted at a vertical face of the side surface of the transparent structure. Even though this side surface may be flat, the refraction induces a form of lensing on the light due to the angles at which the side surface is struck. As a result, the range of angles of light within the transparent structure may be limited. This means it may be difficult for the light to illuminate the parts of an at least partially reflective layer that are closest to the side surfaces of the transparent rigid structure nearest the excitation light source. These poorly illuminated portions of the at least partially reflective layer cannot be used for tactile sensing.

In view of the above, in some embodiments one or more fluorescent layers may function to diffuse light into a transparent structure, where the one or more fluorescent layers are in optical contact with the transparent structure. When excited by electromagnetic radiation from one or more excitation light sources, the one or more fluorescent layers randomize the directions of the fluorescent light rays emitted into the transparent structure, thereby improving the illumination of an elastomeric pad nearest the side surface. In this manner, the one or more fluorescent layers are Lambertian and non-directional when emitting fluorescent light. The one or more fluorescent layers being in optical contact with the transparent structure also avoids a lensing effect that may occur if there is an air gap between the one or more fluorescent layers and the transparent structure. The lensing effect is caused by refraction of light rays passing from the one or more fluorescent layers into the air gap and then into to the transparent structure.

In some cases, conventional retrographic sensors are arranged such that light enters a transparent structure and strikes an opposite side surface of the structure, where some significant portion of the light would reflect back into the structure as nuisance illumination. To address this nuisance illumination, in some embodiments the retrographic sensor may also include one or more fluorescent layers which at least partially absorb incident light in one or more wavelength bands. The one or more fluorescent layers may have a limited wavelength band in which the one or more fluorescent layers reflect incident light. For example, the one or more fluorescent layers may have a visual color such that the one or more fluorescent layers absorb light having wavelengths different than that of the visual color. Accordingly, any incident light that does not match the color of the one or more fluorescent layers may be absorbed so as to eliminate or reduce nuisance illumination from reflections in the retrographic sensor. Furthermore, in some embodiments a retrographic sensor may include multiple fluorescent layers disposed on opposing side surfaces of a transparent structure. In some embodiments, the multiple fluorescent layers may be configured to emit fluorescent light in different wavelength bands. Additionally, the multiple fluorescent layers may be configured to absorb the fluorescent light emitted from the opposing fluorescent layer. In this manner, the multiple fluorescent layers may provide illumination of different wavelength bands from different sides of the transparent structure, while absorbing and reducing nuisance illuminated caused by reflection of the emitted fluorescent light reflecting back into the transparent structure. Embodiments including multiple fluorescent layers configured to emit and absorb wavelengths of light in different wavelength ranges are described further below.

In view of the above, the inventors have also recognized the benefits in a fluorescent layer having a reflectance wavelength band approximately equal to or substantially overlapping with a fluorescent light emission band. In some cases, fluorescent dyes or pigments may not reflect light in a wavelength corresponding to the wavelength of fluorescent light they emit when excited. Accordingly, it may be desirable to tune one or more fluorescent layers to reflect light in a wavelength band equal to a wavelength band of the fluorescent emissions. Such an arrangement may allow the one or more fluorescent layers to better absorb nuisance illumination compared to an unaltered fluorescent layer where the reflectance wavelength band and fluorescent emission wavelength band do not match. In some embodiments, a fluorescent paint may have other pigments, dyes, or paints added to alter the wavelength band of light reflectance (corresponding to a visual appearance) to match a wavelength band of fluorescent emissions. Of course, any suitable fluorescent layer may be employed, including those having reflectance wavelength bands and fluorescent emission wavelength bands that do not match or overlap, as the present disclosure is not so limited.

In some embodiments, a retrographic sensor includes a transparent structure including an interior surface, an exterior surface, a first side surface extending between the interior surface and the exterior surface, and a second side surface extending between the interior surface and the exterior surface. The retrographic sensor may also include a transparent elastomeric pad disposed on the exterior surface of the transparent structure. As discussed previously, the transparent elastomeric pad may be configured to deform when the elastomeric pad contacts an object. Light reflecting from the exterior surface of the elastomeric pad (e.g., off of an at least partially reflective layer) may change based on this deformation, which is detectable by a photosensitive detector. The retrographic sensor may also include a first fluorescent layer disposed on the first side surface. The first fluorescent layer may be configured to emit a first fluorescent light in a first emission wavelength band (e.g., having a first dominant wavelength) into the transparent structure. The retrographic sensor may include a second fluorescent layer disposed on the second side surface. The second fluorescent layer may be configured to emit a second fluorescent light in a second emission wavelength band (e.g., having a second dominant wavelength that is different from the first dominant wavelength) into the transparent structure. The first and second emission wavelength bands may be different and substantially non-overlapping with each other (e.g., they have different dominant wavelengths). The first side surface and second side surface may at least partially oppose one another. That is, the light emitted from the first fluorescent layer and the light emitted from the second fluorescent layer may intersect. In some embodiments, the first fluorescent layer is configured to absorb the second fluorescent light that is incident on the first fluorescent layer, and the second fluorescent layer is configured to absorb the first fluorescent light that is incident on the second fluorescent layer. In some embodiments, the first fluorescent layer may have a reflectance wavelength band substantially similar to its emission wavelength band and the second fluorescent layer may have a reflectance wavelength band substantially similar to its emission wavelength band.

In some embodiments, a method of operating a retrographic sensor includes illuminating a first fluorescent layer disposed on a first side surface of a transparent structure with an excitation light source to excite fluorescence of the first fluorescent layer. The method may also include illuminating a second fluorescent layer disposed on a second side surface of a transparent structure with an excitation light source to excite fluorescence of the second fluorescent layer. In some embodiments, the excitation light source may be configured to emit excitation light having a dominant wavelength between 200 and 500 nm. The excitation light source may include one or more light sources which illuminate an interior surface of the fluorescent layer or an exterior surface of the first and second fluorescent layers. The method may also include emitting a first fluorescent light and a second fluorescent light into the transparent structure toward a transparent elastomeric pad disposed on an exterior surface of the transparent structure. The method may also include reflecting the first and second fluorescent lights off of an exterior surface of the elastomeric pad toward an interior surface of the transparent structure. In some embodiments, this reflection may be a reflection off an at least partially reflective (e.g., semi-specular, matte) layer disposed on the exterior surface of the elastomeric pad. The light reflected from the elastomeric pad may be received at a photosensitive detector physically and/or visually oriented toward to the interior surface of the transparent structure. The method may also include absorbing, at the first fluorescent layer, light from the second fluorescent layer that is incident on the first fluorescent layer. The method may also include absorbing, at the second fluorescent layer, light from the first fluorescent layer that is incident on the second fluorescent layer. In this manner, nuisance illumination of the elastomeric pad may be reduced.

In some embodiments, a retrographic sensor may include one or more filters disposed on one or more side surfaces of the transparent structure. In such an embodiment, the one or more filters may be in optical contact with the transparent structure, and one or more fluorescent layers may be disposed on an exterior surface of the one or more filters. Accordingly, the one or more filters may be positioned between the transparent structure and the one or more fluorescent layers. The presence of the filters may further reduce nuisance illumination compared with the presence of fluorescent layers alone. With filters disposed on opposing side surfaces of the transparent structure, the filters attenuate reflected rays more so than direct illumination from the one or more fluorescent layers. That is, any reflected nuisance illumination will be attenuated thrice by filters, once on first entry to the transparent structure through a first filter, once when the light exits the structure into a second filter on an opposite side of the structure, and once when the light potentially reflects from the fluorescent layer adjacent the second filter on an opposite side of the structure. In contrast, direct light from a fluorescent layer passes through a filter only once. In this manner, nuisance illumination in the retrographic sensor may be further reduced. In some embodiments, there is no air gap between the filter and the transparent rigid structure. The lack of an air gap reduces or eliminates any lensing effect between the filter and the transparent rigid structure, as discussed above.

In some embodiments a filter employed with a retrographic sensor may be a neutral density (ND) filter. In other embodiments, a filter employed with a retrographic sensor may be a colored filter configured to absorb wavelengths of light other than a particular wavelength or wavelength band of light. In such an arrangement, one or more fluorescent layers may emit two or more wavelengths of light from different sides of a transparent structure, as will be discussed further with reference to other embodiments. Accordingly, in some embodiments, multiple filters of different colors may be employed corresponding to wavelengths emitted by the one or more fluorescent layers. For example, a first fluorescent layer emitting a blue wavelength of light may be adjacent a blue colored filter on a first side of the transparent structure, while a second fluorescent layer emitting a red wavelength of light may be adjacent a red filter on a second side (e.g., opposite side) of the transparent structure. The blue filter may absorb a significant portion of the red wavelength of light that could reflect as nuisance illumination if not fully absorbed, and likewise the red filter may absorb a significant portion the blue wavelength of light that could reflect as nuisance illumination if not fully absorbed. Accordingly, in some embodiments, a filter may be configured to absorb wavelengths of light other than a fluorescent emission wavelength or emission wavelength band of a fluorescent layer disposed on the filter. Of course, any suitable filter arrangement may be employed including any number of filters of different colors or of the same color, as the present disclosure is not so limited.

In some embodiments, a filter employed in a retrographic sensor disposed between one or more fluorescent layers and a transparent structure may be configured to absorb at least a portion of the light from one or more fluorescent layers. Accordingly, the effects of light reflecting off one or more side surfaces of the transparent structure may be reduced, as the filter may attenuate the light each time the light from the one or more fluorescent layers passes through the filter. In some embodiments, a filter may be configured to absorb greater than or equal to 25%, 35%, 50%, 60%, 70%, 80%, 85% and/or any other suitable percentage of light emitted from the one or more fluorescent layers. Correspondingly, a filter may be configured to absorb less than or equal to 99%, 90%, 80%, 70%, 60%, 50%, 40%, 25% and/or any other suitable percentage of light emitted from the one or more fluorescent layers. Combinations of the above-noted ranges are contemplated, including percentages of absorption of light from one or more fluorescent layers between 50% and 80%, 60% and 80%, 50% and 60%, as well as 25% and 50%. Of course, a filter may absorb any suitable percentage of light from the one or more fluorescent layers, as the present disclosure is not so limited. It should be noted that any suitable percentage of light may be absorbed by the filter and an absorption percentage may be at least partly based on the power of light emitted from the one or more fluorescent layers. That is, the power of light emitted from the one or more fluorescent layers may affect the amount of light ultimately reaching a photosensitive detector, and thus the absorption percentage of a filter may be selected such that an appropriate amount of light reaches the photosensitive detector.

In some cases, it may be desirable to increase the perceptibility of deformations of an elastomeric pad employed with an at least partially reflective layer as perceived by an imaging device. In some embodiments, an imaging device (e.g., a photosensitive detector, camera, etc.) may include one or more color channels configured to perceive different wavelengths of light, similar to other embodiments discussed previously. To utilize these separate channels in some imaging devices, in some embodiments a retrographic sensor may employ at least two different fluorescent layers emitting at least two different wavelengths of light positioned along multiple separate side surfaces of a transparent structure disposed at different angles relative to one another. While exemplary embodiments described herein refer to singular wavelengths, it should be appreciated that in other embodiments singular wavelengths (e.g., dominant wavelengths) may correspond to a band of wavelengths, as the present disclosure is not so limited. For example, light of a first wavelength may be emitted into the transparent structure in a first direction using a first fluorescent layer positioned on a first side of the transparent structure, while light of a second wavelength is emitted into the transparent structure in a second different direction using a second fluorescent layer positioned on a second side of the transparent structure. The at least two different wavelengths of light maybe perceived by an imaging device configured to perceive the first wavelength and second wavelength of light on separate channels. Such an arrangement may allow for more precision in characterizing a surface or object in contact with an at least partially reflective layer. For example, the different wavelengths of light may enable photometric stereo processing.

In some embodiments, light of three different wavelengths may be emitted into a transparent structure along three different side surfaces of the transparent structure by three fluorescent layers. For example, a first wavelength of light emitted into the transparent structure by a first fluorescent layer may be between 635 nm and 700 nm (corresponding to the color red), a second wavelength of light emitted into the transparent structure by a second fluorescent layer may be between 560 nm and 520 nm (corresponding to the color green), and a third wavelength of light emitted into the transparent by a third fluorescent layer structure may be between 490 and 450 nm (corresponding to the color blue). In some embodiments, light of two different wavelengths may be emitted into a transparent structure along two different side surfaces of the transparent structure by two fluorescent layers. Of course, one or more fluorescent layers may emit any suitable wavelength(s) of light into a transparent structure of a retrographic sensor at any suitable angle, as the present disclosure is not so limited. For example, in some embodiments, one or more fluorescent layers may emit electromagnetic radiation in any appropriate range of wavelengths, including ultraviolet, near-infrared, infrared, etc. Correspondingly, an imaging device of a retrographic sensor may be configured to receive and detect electromagnetic radiation emitted from the one or more fluorescent layers, where that electromagnetic radiation has any appropriate range of wavelengths. Accordingly, while exemplary embodiments described herein employ visual light in a range of 380 nm to 700 nm, any suitable wavelength of electromagnetic radiation may be employed, as the present disclosure is not so limited.

According to exemplary embodiments of the sensors including semi-specular reflective or matte layers described herein, a retrographic sensor may include an imaging device. The imaging device may be a camera or other appropriate type of photosensitive detector directed towards a transparent structure (e.g., a block, a shell, etc.). For example, in one embodiment, an imaging device may include separate imaging channels capable of separately detecting different wavelengths of light. In one such embodiment, the imaging device may be a red green blue (RGB) camera or any other suitable camera suitable for receiving reflected light from a transparent structure. The imaging device may pass a signal corresponding to an image of the sensor assembly to a processor for processing. The processor may be configured to execute computer readable instructions stored in volatile or non-volatile memory. In some instances, and as described further below, the processor may use the signal to determine information about an object or surface in contact with the sensor which may then be used for controlling a robotic system, such as a robotic manipulator, associated with the sensor. In some embodiments, a photosensitive detector may not be physically oriented toward a transparent structure but may instead be visually oriented toward the transparent structures via one or more mirrors. In this manner, a photosensitive detectors may be physically oriented in any suitable orientation, as the present disclosure is not so limited.

According to exemplary embodiments described here, a fluorescent layer may include any suitable pigments, dyes, or other materials configured to emit light in a wavelength band when excited by electromagnetic radiation from one or more excitation light sources. In some embodiments, a fluorescent layer may include fluorescent paint. In some embodiments one or more fluorescent layers of a retrographic sensor may be configured to emit fluorescent light in the visible spectrum (380 to 700 nm). Of course, one or more fluorescent layers may emit light in any suitable wavelength band, as the present disclosure is not so limited.

While embodiments described herein include a transparent structure having a rectangular prism, semi-spherical or quarter-spherical shape, any suitable curved shape may be employed for a retrographic sensor, as the present disclosure is not so limited. For example, cylindrical and ellipsoidal shapes for a structure may also be employed. The structure may form an overall shape matching the retrographic sensor. That is, in some embodiments, the elastomeric pad and an at least partially reflective layer may have a shape matching that of the underlying structure.

In some embodiments, the assembly of a retrographic sensor may effectively function as a light pipe such that the elastomeric pad is uniformly lit from one or more fluorescent layers. In one embodiment, one or more fluorescent layers may be positioned at one or more side surfaces of the transparent structure, where the one or more side surfaces of the transparent structure extend between an interior surface (e.g., curved interior surface) and an exterior surface (e.g., curved exterior surface) of the structure. The one or more fluorescent layers may emit light into the transparent structure from this position proximate the side surfaces of the structure, such that at least a portion of the emitted light undergoes internal reflection inside of the transparent structure and elastomeric pad, reflecting off of the at least partially reflective layer and an air boundary adjacent the interior surface of the structure. This arrangement allows the fluorescent light emitted to uniformly spread throughout the elastomeric pad, as the light is effectively light piped through the structure. When an object or surface contacts the at least partially reflective layer, the elastomeric pad may deform, thereby changing a reflective angle of the light in that area in a manner that may be detected by the imaging device. Accordingly, the characteristics of the object or surface may be determined by the change in the light in the assembly as observed by the imaging device. The imaging device may be positioned to view the transparent structure side of the assembly. That is, the imaging device may be physically and/or visually oriented toward an internal surface of the transparent structure opposite the elastomeric pad.

In some cases, the uniformity of the light distribution within the sensor as well as the resolution of the sensor may be at least partially dependent on the reflective characteristics of an at least partially reflective layer included in a retrographic sensor assembly. That is, the inventors have recognized that the illumination of an elastomeric pad and the ability for an imaging device to detect changes in light reflection are in some ways at odds with one another. For example, use of a matte material which effectively scatters incident light in the at least partially reflective layer may result in an elastomeric pad with non-uniform lighting, with portions of the pad nearest the one or more fluorescent layers being more brightly illuminated than portion further away from the one or more fluorescent layers. Accordingly, the ability to detect objects or surfaces in the less illuminated areas is diminished or eliminated in such instances. As a contrasting example, use of a mirrored material in the at least partially reflective layer where light is reflected at the angle of incidence on the layer may result in difficulty detecting changes in the elastomeric pad, as any light reflecting as a result of deformation may be concentrated at a specific angle which may miss an imaging device. Thus, the inventors have recognized the benefits of an at least partially reflective layer that is specular, as such a layer may improve both the uniformity of illumination and sensitivity of a sensor in some embodiments.

In view of the above, the inventors have recognized that the sparseness of a captured image may be reduced, and the smoothness of the shading image may be increased in some embodiments if a semi-specular membrane or coating is employed. A semi-specular membrane may be specular, in that an angle of incidence is similar to an angle of reflection, but the reflection has a wide specular lobe. The peak of the specular lobe will have an angle equal to that of an angle of incidence. For example, semi-specular materials may appear like blurry mirrors, similar to the appearance of sandblasted metal or metal flake paint. In some embodiments, a semi-specular membrane, coating, or other appropriate type of layer may be made using specular flakes such as small flakes of metal, mica, or other pigment particles that are flat and provide specular reflection from their flat sides. In a semi-specular membrane including metal flakes, the flakes may have a distribution of orientations and they may not be perfectly flat relative to a surface of an elastomeric pad on which they are disposed. Thus, there is a tendency for light to be reflected in the specular direction, but there is also a great deal of random variation about that direction. The result is that the semi-specular membrane reflectance has a broad specular lobe where the reflection angle is distributed around the expected reflection angle for a purely specular reflectance. While a semi-specular membrane according to exemplary embodiments described herein may employ a coating or membrane including specular flakes, any suitable material or coating may be employed to form a semi-specular layer, as the present disclosure is not so limited.

In view of the foregoing, in some embodiments, an at least partially reflective layer used with the embodiments of retrographic sensors described herein may be a semi-specular material with respect to light supplied by one or more fluorescent layers (e.g., visual light in a wavelength between 380 to 700 nm). In some embodiments, an at least partially reflective layer such as a semi-specular layer may have a reflectance under light from the one or more fluorescent layers greater than or equal to 50%, 60%, 75%, 80%, 90% and/or any other suitable percentage. Correspondingly, the at least partially reflective layer may have a reflectance under light from the one or more fluorescent layers less than or equal to 100%, 95%, 90%, 75%, 60%, and/or any other suitable percentage. Combinations of these values are contemplated, including an at least partially reflective layer having a reflectance under light from the one or more fluorescent layers between 50% and 95%, between 60% and 80%, or between 75% and 100%. Of course, an at least partially reflective layer such as a semi-specular material may have any suitable reflectance under light from the one or more fluorescent layers, including a reflectance less than those noted above, as the present disclosure is not so limited.

As noted previously, in some embodiments a semi-specular material may also have a specular lobe suitable for promoting internal reflection of light emitted into a transparent structure (e.g., shell) and elastomeric pad. That is, the specular lobe of the semi-specular layer may be configured such that light emitted from one or more fluorescent layers (e.g., visual light in a wavelength between 380 to 700 nm) is reflected at suitably shallow angles to promote uniform illumination of an associated elastomeric pad by a light piping effect. In some embodiments, a semi-specular layer of a retrographic sensor may have a specular lobe with a width less than or equal to 90 degrees, 75 degrees, 60 degrees, 50 degrees, 40 degrees, 30 degrees, 15 degrees, and/or another other appropriate angle when reflecting light emitted from a point light source. The width of the specular lobe may be measured as the full angle at which the intensity has fallen by ½ from its peak on either side of the lobe. For example, a specular lobe width of 10 degrees would mean that the intensity falls by ½ at an angle +5 degrees or −5 degrees from the peak of the specular lobe. Corresponding to the above, a specular lobe of the semi-specular layer may have a width greater than or equal to 2 degrees, 6 degrees, 10 degrees, 15 degrees, 20 degrees, 25 degrees, 30 degrees, and/or any other appropriate width when reflecting light emitted from a point light source. In some embodiments, the semi-specular layer employed in a sensor may have a specular lobe with a width between 6 degrees and 50 degrees, 6 degrees and 40 degrees, 15 degrees and 40 degrees, 10 and 30 degrees, and/or any other suitable angular width greater than or less than the ranges noted above when reflecting light emitted from a point light source.

In some embodiments, the relative geometry of an elastomeric pad and transparent structure (e.g., a shell) may affect the uniformity and sensitivity of a retrographic sensor to deformation of the elastomeric pad. In particular, a combined thickness of transparent materials in a sensor assembly of a retrographic sensor (e.g., a thickness of the transparent structure plus a thickness of the elastomeric pad may be most effective when tuned for a radius of curvature of an exterior surface of the elastomeric pad located opposite an underlying shell or other supporting structure. In some embodiments, the combined thickness of the transparent materials in the sensor assembly may be greater than or equal to 3%, 4%, 7%, 10%, 15%, and/or any other suitable percentage of a radius of curvature of the exterior surface. Correspondingly, the combined thickness of the transparent materials in the sensor assembly may be less than or equal to 25%, 20%, 15%, 12% 10%, and/or any of suitable percentage of its radius of curvature. Combinations of the above noted values are contemplated, including, but not limited to, thicknesses of the transparent materials in the sensor assembly between 3% and 25% of its radius of curvature, 4% and 20% of its radius of curvature, 7% and 15% of its radius of curvature, as well as 4% and 10% of its radius of curvature. Of course, the transparent materials in a sensor assembly may have any suitable thickness, as the present disclosure is not so limited.

While in some embodiments described above include a semi-specular layer, in other embodiments a retrographic sensor may include an at least partially reflective layer configured as a matte layer, as the present disclosure is not so limited. In some such embodiments, the transparent structure may be shaped as a rectangular prism or may otherwise include a flat exterior surface.

According to exemplary embodiments described herein, an at least partially reflective layer (e.g., a semi-specular layer or matte layer) may be formed by any suitable method. In one embodiment, the layer may be formed as a membrane and joined to an elastomeric pad with an optical adhesive. In another embodiment the layer may be painted or coated on an elastomeric pad. Of course, other arrangements are contemplated, and the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
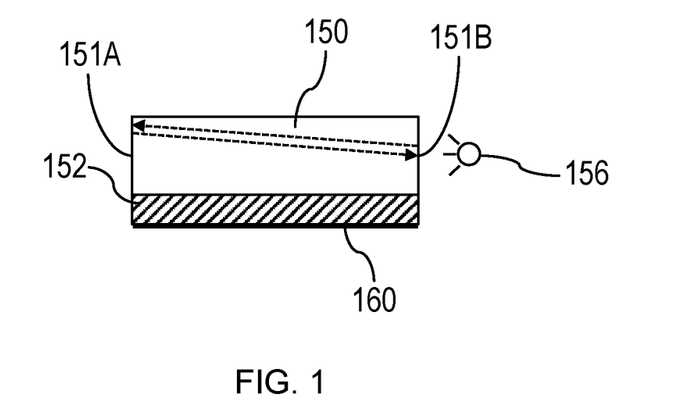
FIG. 1 is a schematic of one embodiment of a retrographic sensor.

FIG. 1 is a schematic of one embodiment of a retrographic sensor. As shown in FIG. 1, a transparent structure 150 and elastomeric pad 152 are optically joined to form a sensor assembly. The retrographic sensor also includes an at least partially reflective layer 160 disposed on an exterior surface of the elastomeric pad 152. A light source 156 emits light into a side surface of the transparent structure 150 to illuminate the at least partially reflective layer 160. The arrangement shown in FIG. 1 is conventional and presents issues with nuisance illumination and illumination of the at least partially reflective layer 160 near the side edges of the transparent structure. As shown in FIG. 1, light that enters through side surface 151B will travel in various directions through the structure and the gel pad, and some of it will strike the opposite side surface 151A. There, the light encounters an air interface, which will reflect some significant portion of light back into the structure 150, where it will act as nuisance illumination that interferes with the desired shaded image. Additionally, due to the air gap between the light source 156 and the side surface 151B, the light emitted from the light source will experience a lensing effect, whereby the portions of the at least partially reflective layer 160 adjacent the side surface 151B are not well-illuminated.

Figure 2:
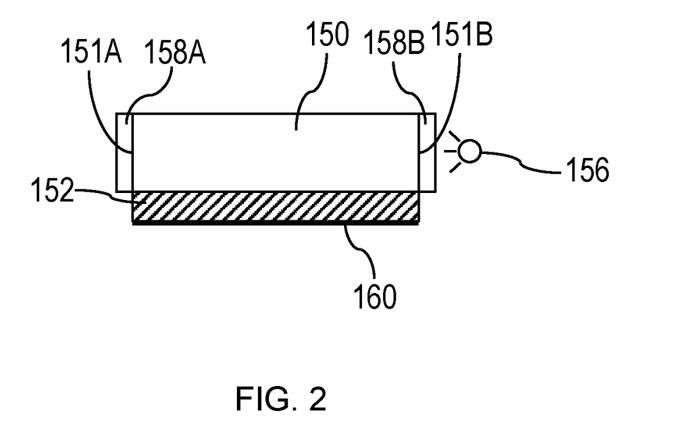
FIG. 2 is a schematic of yet another embodiment of a retrographic sensor.

In view of the challenges associated with FIG. 1, the inventors have recognized the benefit of the retrographic sensor shown in FIG. 2. As shown in FIG. 2, filters, 158A, 158B are placed in optical contact with the side surfaces 151A, 151B of the structure 150. In some embodiments, these filters may be a neutral density (ND) filter, or a colored filter. When light strikes the side surface 151A from within the structure 150, it travels into the filter 158A, where some portion of it is absorbed. In some embodiments, the material of the filter is index matched to that of the structure, such that there is little to no reflection at the interface. In some embodiments, an ND filter may be employed that absorbs 50% or more of the light and transmits 50% or less of the light. In this embodiment, 50% or less of light incident on the ND filter from inside of the structure 150 will continue through the ND filter and will strike the air interface on the outer side of the ND filter. At this point some of the light will be reflected inward back towards the structure, but this reflected light will again be attenuated by the ND filter before it returns to the inside of the structure. Thus, the reflected light passes through the filter twice, whereas the direct light (e.g., light from the light source 156) passes through a filter only once. Thus, the ND filter will reduce the amount of light that bounces around inside of the structure and will accordingly reduce nuisance illumination, thereby improving the sensitivity of the sensor.

In some embodiments, if the light source 156 includes multiple light sources with different wavelengths, then the filters 158A, 158B may also have different absorbance properties at different wavelengths (e.g., color filters for the different color light sources). For example, if a red filter is employed on one side, but a different filter color (e.g., blue) is provided on the opposite side of the structure, direct light from a light source emitting light corresponding to the color of the first filter may pass through the first filter into the structure unabsorbed while the same light incident on the second filter from inside of the structure may be substantially absorbed. For example, a red LED passes relatively untouched through a red filter on the way in, but when it encounters a blue filter on the other side the red light is absorbed. This use of colored filters may lead to a more efficient system, in that intensity of the input lights is not being attenuated while passing into the structure 150.

According to the embodiment of FIG. 2, the filters 158A, 158B are in optical contact with the structure 150. If the filters are not in optical contact with the structure, the resulting air gap between the filter and the structure may cause reflection at the air interface, such that the filters are not able to attenuate the reflected light.

Figure 3:
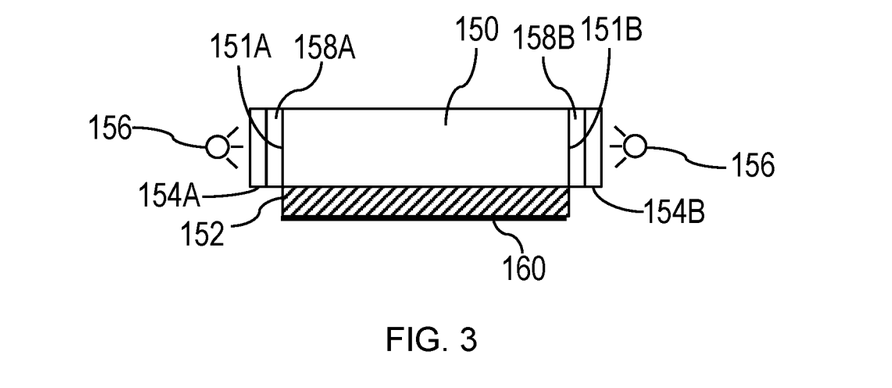
FIG. 3 is a schematic of yet another embodiment of a retrographic sensor.

FIG. 3 is a schematic of yet another embodiment of a retrographic sensor employing both diffusers 154A, 154B and filters 158A, 158B, in series. In the depicted embodiments, the diffusers 154A, 154B are disposed on and in optical contact with an exterior surface of the corresponding filters 158A, 158B which are disposed on and in optical contact with the corresponding side surfaces 151A, 151B. As shown in FIG. 3, light sources 156 shine through the diffusers, through the filters, and into the structure 150. There is optical contact between these layers so there is no air gap which may cause internal reflection in any layer. Once inside of the structure, the light may illuminate an elastomeric pad 152 disposed on a surface of the structure extending between the two depicted side surfaces of the structure. The arrangement shown in FIG. 3 may have additional benefits relative to the embodiment of FIG. 2. Namely, the arrangement reduces nuisance illumination from internal reflections back toward an originating light source and may also improve illumination of the elastomeric pad 152 nearest the side surfaces of the structure 150.

The inventors have appreciated the benefits of an illumination arrangement for a retrographic sensor that allows for reduction in nuisance illumination from reflections of light and allows for illumination of edges of an elastomeric pad nearest side surfaces of a transparent structure, as discussed with reference to FIGS. 1-3. However, the inventors have further appreciated an arrangement where the illumination assembly along a side surface of the transparent structure with a fluorescent layer that may, in some embodiments, be easy to apply, inexpensive, and more compact than the arrangements shown in FIGS. 2-3. Exemplary embodiments including one or more such fluorescent layers are discussed further below.

Figure 4:
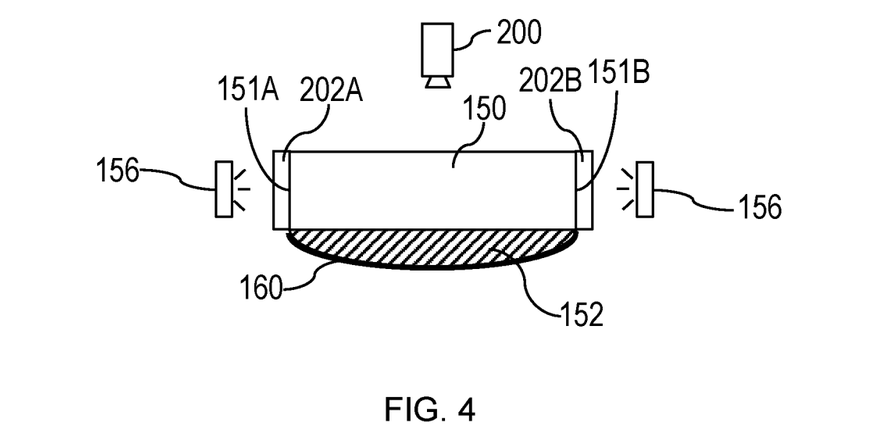
FIG. 4 is a schematic of yet another embodiment of a retrographic sensor.

FIG. 4 is a schematic of yet another embodiment of a retrographic sensor. According to the embodiment of FIG. 4, the retrographic sensors includes a first fluorescent layer 202A and a second fluorescent layer 202B disposed on a first side surface 151A and a second side surface 151B of a transparent structure 150, respectively. These fluorescent layers may replace the filter and diffuser stack shown in FIG. 3, for example. The fluorescent layers may be thinner than the filters and/or diffuser, yielding a more compact retrographic sensor. In some embodiments, the light sources 156 may be ultraviolet LEDs, which excite fluorescence in the fluorescent layers 202A, 202B. In some embodiments, the first fluorescent layer and second fluorescent layer may be formed of fluorescent paint.

According to the embodiment of FIG. 4, the retrographic sensor also includes an elastomeric pad 152 which has an exterior surface covered by an at least partially reflective layer 160. When in contact with an object or other surface, the elastomeric pad 152 and at least partially reflective layer 160 may deform, thereby altering the reflections of light inside the elastomeric pad and transparent structure. These differences may be perceived by an imaging device 200 and interpreted (e.g., by a processor) to understand the shape or texture of the surface or object causing the deformation. While in the embodiment of FIG. 4 an elastomeric pad 152 having a curved exterior surface is employed, an elastomeric pad having any desirable shape may be employed, including an elastomeric pad having a flat exterior surface, as the present disclosure is not so limited.

In some embodiments, the first fluorescent layer 202A and second fluorescent layer 202B may be configured emit different wavelengths of fluorescent light. If, for example, first fluorescent layer 202A fluoresces red (e.g., light having a wavelength between 635 nm and 700 nm) and second fluorescent layer 202B fluoresces green (e.g., light having a wavelength between 560 nm and 520 nm), then the transparent structure 150 is filled with red light from one side and green light from the other side. The light sources 156 as shown in FIG. 4 illuminate an exterior surface of the fluorescent layers 202A, 202B. However, in other embodiments, the illumination of the first fluorescent layer 202A and second fluorescent layer may come from within the block. For example, one or more light sources may emit light toward an interior surface of the first fluorescent layer and second fluorescent layer. One embodiment including such an arrangement will be described further with reference to FIG. 5.

According to the embodiment of FIG. 4, if the first fluorescent layer 202A fluoresces light in a first wavelength (e.g., red) under ultraviolet light and also reflects lights in that first wavelength (e.g., appears red when viewed under visible light), the first fluorescent layer may serve a similar function as the filters described with reference to the embodiments of FIGS. 2 and 3. Furthermore, the fluorescent layer may also function as the diffuser described with reference to FIG. 3. In the embodiment of FIG. 4, the emitted fluorescent light is already diffuse due to the properties of fluorescent emission. In addition, the fluorescent layers prevent multiple reflections of the light within the block, meaning an additional filter may be redundant or otherwise not required. In a case where the second fluorescent layer 202B fluoresces light in a second wavelength (e.g., green) under ultraviolet light and also reflects lights in that second wavelength (e.g., appears green when viewed under visible light), the second fluorescent light will travel across the transparent structure 150 until it strikes the first fluorescent layer 202A, at which point the second fluorescent light will be absorbed because the first fluorescent layer does not reflect light in the wavelength of the second fluorescent light. Likewise, the second fluorescent layer 202B would also absorb light emitted from the first fluorescent layer 202A, thereby reducing nuisance illumination caused by returning reflections from the side surfaces of the transparent structure. Thus, the functions of diffusion and absorption are automatically provided by the fluorescent layers.

In some embodiments, the fluorescent layers may be configured to fluoresce in wavelengths corresponding to red and green visual colors. While it is possible to use fluorescent blue paint as well, some blue pigments are of low efficiency and low purity compared to those of red and green. Thus, in some embodiments, it may be preferable to supply light corresponding to the blue visual color (e.g., light having wavelengths between 490 and 450 nm) from one or more light sources (e.g., LEDs), and red and green light from fluorescent layers. Of course, any suitable arrangement of light sources and fluorescent layers may be employed to provide illumination in a retrographic sensor, as the present disclosure is not so limited.

According to exemplary embodiment described herein, ultraviolet light may be employed as the exciting source for fluorescence of one or more fluorescent layers. It will be understood that other wavelengths of light, including those in the blue or violet range (e.g., between 380 and 490 nm), may also be used to excite fluorescence in some embodiments. Indeed, fluorescence can often be induced by many wavelengths that are shorter than the emission wavelength, so the exciting wavelengths could be in a wide range of the visible spectrum (e.g., between 380 and 750 nm) Such visible lights may be used for fluorescent excitation if they do not interfere with the visibility of the information derived from the fluorescent emissions of the one or more fluorescent layers.

The embodiment of FIG. 4 employs a transparent structure 150 having a rectangular prism (e.g., block) shape. Additionally, the at least partially reflective layer 160 is configured as a matte layer. However, one or more fluorescent layers may also be employed with a transparent structure having a curved shape. Additionally, one or more fluorescent layers may be employed with a semi-specular layer. One such embodiment will be discussed further with reference to FIG. 5.

Figure 5:
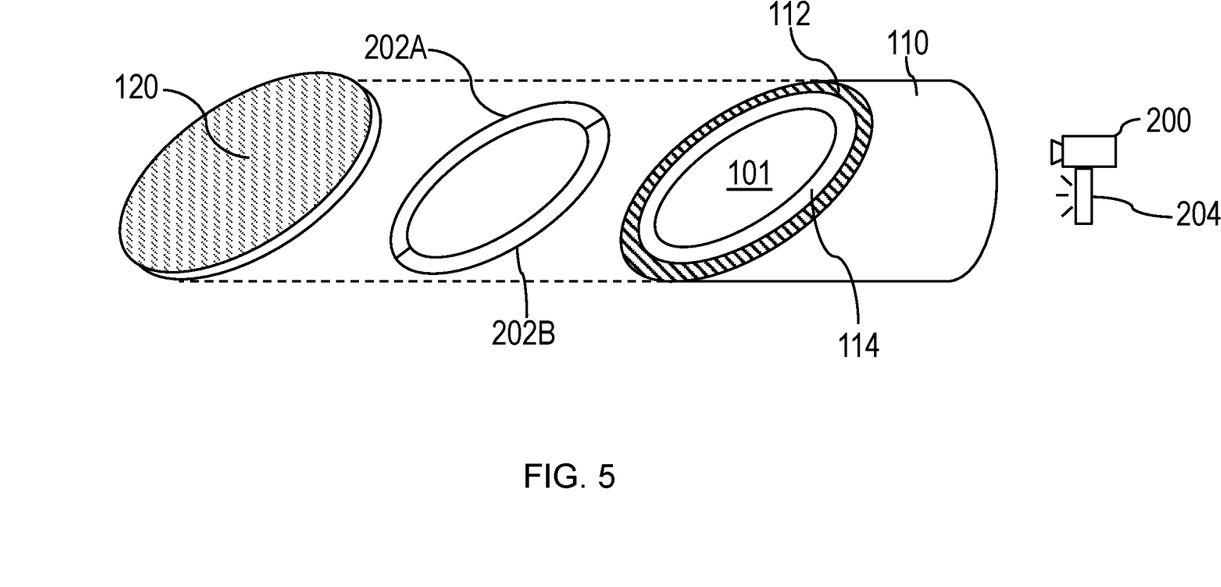
FIG. 5 is a schematic of yet another embodiment of a retrographic sensor.

FIG. 5 is a schematic of yet another embodiment of a retrographic sensor. In some cases, it may be desirable to have a tubular robotic finger with a beveled end. Such embodiments may be appropriate when inserting the finger into granular material, among other applications. In some embodiments, the tubular robotic finger may be cylindrical in shape or formed as a portion of a cylinder. In other embodiments, a tubular robotic finger's cross section may be a rounded rectangle or other non-circular shape. According to the embodiment of FIG. 5, the retrographic sensor includes a hollow cylindrical shell 114 that may be made of clear acrylic or another transparent material. The cylindrical tube is surrounded with a cylindrical elastomeric pad 112, which in turn is coated with semi-specular layer 110. According to the embodiment of FIG. 5, the retrographic sensor includes a first fluorescent layer 202A and a second fluorescent layer 202B. The first and second fluorescent layers are configured to be positioned on a distal end of the cylindrical shell 114. As shown in FIG. 5, the cylinder is cut at an angle at the distal end of the cylinder, producing an elliptical section. LED array 204 may emit light (e.g., blue light) into the cylinder, and excite the first fluorescent layer 202A and second fluorescent layer 202B, as discussed previously with reference to other embodiments. The light emitted from the first fluorescent layer and the second fluorescent layer may illuminate the elastomeric pad 112 via light piping, an example of which will be discussed further with reference to FIGS. 6A-6B. An elliptical mirror, 120 is placed at the distal end of the cylinder. According to this embodiment, an imaging device 200 is oriented down a bore 101 of the cylindrical shell 114. The imaging device receives the image reflected from the mirror 120, which shows the interior of the membrane from a direction perpendicular to the sensing surface. While in the embodiment of FIG. 5 the cylindrical shell 114 is closed to form a complete annulus, in other embodiments a shell may be open on one or more sides, providing a C-shaped shell, a U-shaped shell, or other shapes, as the present disclosure is not so limited.

According to the embodiment of FIG. 5, the elastomeric pad 112 is illuminated with three different wavelengths of light, as to provide for computer vision techniques such as photometric stereo. As discussed above, the retrographic sensor includes a first fluorescent layer 202A and a second fluorescent layer 202B. The first and second fluorescent layers are configured to emit different wavelengths (e.g., colors) of light when excited by the LED array 204. For example, the first fluorescent layer may be configured to emit red light, and the second fluorescent layer may be configured to emit green light. A third color of illumination may be provided by the LED array 204. For example, the LED array may emit blue light. Accordingly, the elastomeric pad 112 may be illuminated by three different wavelengths of light. In some embodiments, the intensity of illumination from the LED array 204 may be greater than the intensity of illumination from the first and second fluorescent layers. Accordingly, in some embodiments, the imaging device may include a filter or may otherwise be tuned to compensate for the additional intensity of illumination provided by the LED array. For example, in some embodiments, a yellow filter may be employed with the imaging device 200 to reduce the amount of blue light received by an image sensor of the imaging device. It should be noted that while a blue LED array is employed in the embodiment of FIG. 5, in other embodiments any suitable light source may be employed and emit any suitable wavelength of light, as the present disclosure is not so limited.

Figure 6A:
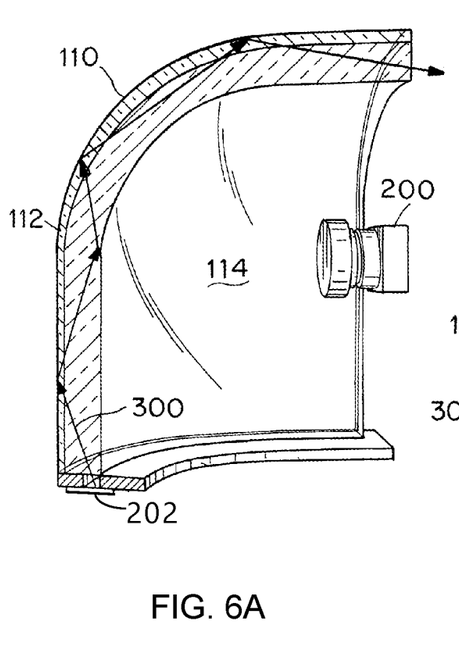
FIG. 6A is a schematic of light piping in another embodiment of a retrographic sensor in a first condition.
Figure 6B:
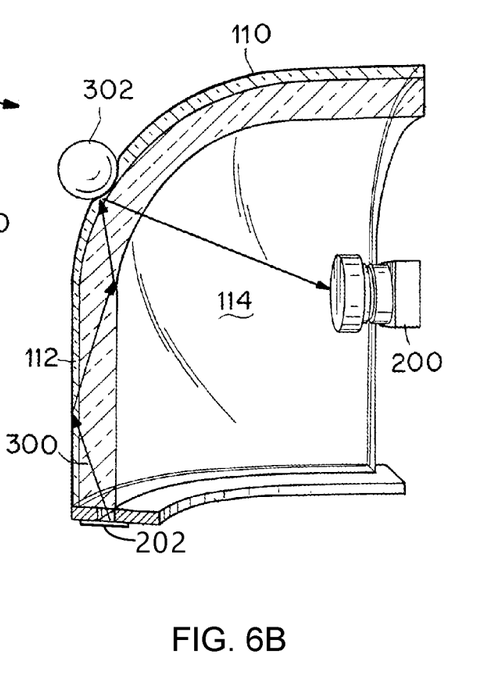
FIG. 6B is a schematic of light piping in the retrographic sensor of FIG. 6A in a second condition.

FIGS. 6A-6B are schematics of light piping within a curved retrographic sensor according to yet another embodiment in a first condition and second condition, respectively. In some embodiments, as shown in FIGS. 6A-6B, a semi-specular layer 110 may be made of a semi-specular material. Due to the semi-specular nature of the layer 110, the reflections from incident light on the semi-specular layer will cause a light piping effect when a transparent shell 114 is illuminated from a side surface of the shell (e.g., by a light source or fluorescent layer 202). As shown in FIGS. 6A-6B, rays of light 300 that strike an interior surface of the transparent shell 114 will encounter an air interface and will tend to be reflected back into the shell toward the elastomeric pad 112, continuing in a similar circumferential direction through the curved shell. Rays of light 300 that strike the semi-specular layer 110 are reflected semi-specularly. Semi-specular reflection causes most of the incident rays to be specularly reflected forward towards the shell 114. However, the semi-specular nature of the layer 110 causes some of the light to be reflected in a variety of directions due to random local variations within the semi-specular layer. Due to these random local variations within the semi-specular layer, some of the light may reflect at an angle that causes the light to escape through the interior surface of the transparent shell, and these rays will be visible to the imaging device 200. Still, the majority of the reflected rays will continue moving away from the light source in the same general circumferential direction. Accordingly, the semi-specular layer 110 allows the entirety of the shell 114 and the elastomeric pad 112 to be evenly illuminated as viewed by the imaging device 200. As will be discussed further with reference to FIG. 6B, the semi-specular layer 110 also allows deformation of the layer and the elastomeric pad 112 to be perceived by the imaging device 200.

In FIG. 6B, a small spherical object 302 is pressed against the semi-specular layer 110 and compresses the elastomeric pad 112 to illustrate the effects that will be visible to the imaging device 200 when an object 302 contacts the semi-specular layer. As the object has deformed the semi-specular layer 110, the surface normal of the semi-specular layer changes based on the surface profile of the object. The amount of light reflected from the overall surface of the semi-specular layer toward the imaging device 200 varies across the surface depending on the surface normal at a particular point on the surface. As the embodiment of FIG. 6B employs a semi-specular layer 110, the image perceived by the imaging device 200 will show a strong shading effect, being brighter on one side or the other depending on the direction of light. The shading will be smoothly graded, which improves the ability to use shape from shading methods in computer vision to extract geometric information about the semi-specular layer 110.

It should be noted that the inventors have recognized a tradeoff that determines the suitable range of a specular lobe for semi-specular reflection. If the specular lobe is too broad, then the light piping effect shown in FIGS. 6A-6B is poor since a significant portion of light is reflected out through the interior surface of the transparent shell 114 each time there is a reflection. If the specular lobe is too narrow, then the light piping effect is good, but the image perceived by the imaging device 200 may consist of sparse highlights as not enough light may be scattered each time there is a reflection. In some embodiments, the width of the specular lobe of a semi-specular layer is based at least partly on the type of pigment flakes that are embedded in the membrane, and the range of angles over which these flakes are aligned. The range of angles may at least partly depend on the way the semi-specular layer was constructed. In some embodiments, a semi-specular layer may be made from an elastomeric paint consisting of a binder, a solvent, and a pigment. After the liquid paint is applied, by such processes as brushing, spraying, dipping, etc., the solvent evaporates, and the membrane thickness reduces. During this evaporation process, the pigment flakes become increasingly aligned with each other. By adjusting the choice of materials and the method of application, it is possible to adjust the width of the specular lobe. However, other types of semi-specular layers and different methods of applying the semi-specular layers may also be employed in a retrographic sensor according to exemplary embodiments described herein, as the present disclosure is not so limited. In some embodiments, the specular lobe of the semi-specular layer has a width in angular subtense between 6 degrees and 40 degrees. (i.e., ±3 degrees or ±20 degrees about a major direction of the specular lobe).

Figure 7:
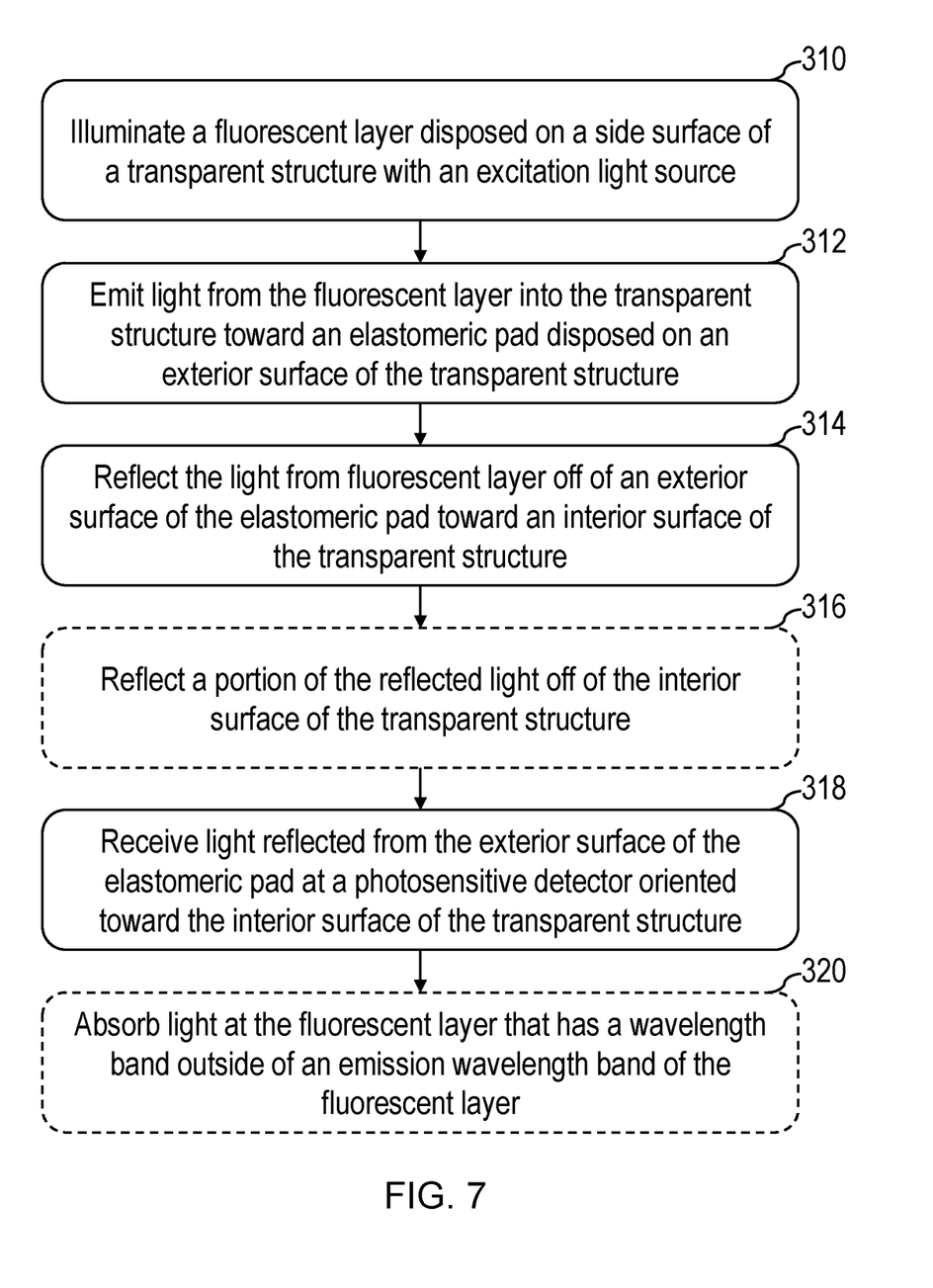
FIG. 7 is a flow chart of one embodiment of a method of operating a retrographic sensor.

FIG. 7 depicts a flow chart of one embodiment of a method of operating a retrographic sensor. In block 310, a fluorescent layer disposed on a side surface of a transparent structure is illuminated with an excitation light source to excite fluorescence of the fluorescent layer. In some embodiments, an interior surface of the fluorescent layer or an exterior surface of the fluorescent layer may be illuminated by the excitation light source. In block 312, a first fluorescent light is emitted from the fluorescent layer into the transparent structure toward a transparent elastomeric pad disposed on an exterior surface of the transparent structure. In some embodiments, the first florescent light may be diffused by the fluorescent layer, such that a portion of the fluorescent light emitted is directed toward the elastomeric pad. In block 314, the first fluorescent light is reflected off of an exterior surface of the elastomeric pad toward an interior surface of the transparent structure. In some embodiments, this reflection may be a reflection off an at least partially reflective (e.g., semi-specular, matte) layer disposed on the exterior surface of the elastomeric pad, as discussed according to exemplary embodiments described herein. In optional block 316, a portion of the reflected light may be again reflected off of the interior surface of the transparent structure. Such a step may be appropriate for a curved transparent structure where light piping is employed, as described above with reference to the exemplary embodiment of FIGS. 6A-6B. According to optional block 316, light may be repeatedly reflected within the transparent structure and elastomeric pad to illuminate the elastomeric pad more uniformly. In block 318, the light reflected from the elastomeric pad is received at a photosensitive detector physically and/or visually oriented toward to the interior surface of the transparent structure. In optional block 320, light may be absorbed at the fluorescent layer that has a wavelength band outside of an emission wavelength band of the fluorescent layer. For example, light from additional fluorescent layers may be absorbed at the fluorescent layer, as discussed herein. In an embodiment according to block 320, the reflectance wavelength band of the fluorescent layer may be the same or substantially overlapping with an emission wavelength band of the fluorescent layer.

Figure 8:
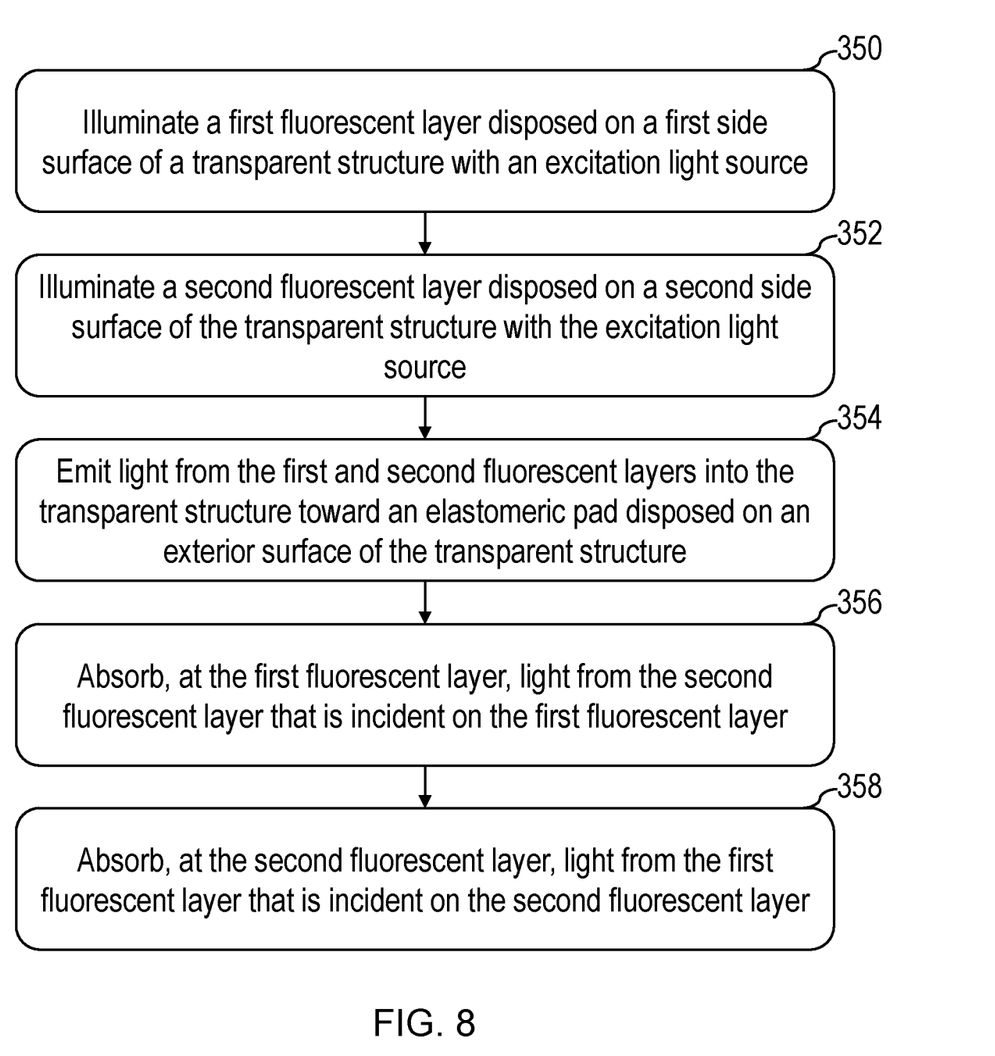
FIG. 8 is a flow chart of another embodiment of a method of operating a retrographic sensor.

FIG. 8 depicts a flow chart of another embodiment of a method of operating a retrographic sensor to reduce nuisance illumination within a transparent structure of the retrographic sensor. As shown in block 350 of FIG. 8, a first fluorescent layer disposed on a first side surface of a transparent structure is illuminated with an excitation light source to excite fluorescence of the first fluorescent layer. In block 352, a second fluorescent layer disposed on a second side surface of a transparent structure is illuminated with the excitation light source to excite fluorescence of the second fluorescent layer. The excitation light source may include one or more light sources which illuminate an interior surface of the fluorescent layer or an exterior surface of the first and second fluorescent layers. In block 354, a first fluorescent light and a second fluorescent light are emitted into the transparent structure toward a transparent elastomeric pad disposed on an exterior surface of the transparent structure. The method may also include reflecting the first and second fluorescent lights off an exterior surface of the elastomeric pad toward an interior surface of the transparent structure. In some embodiments, this reflection may be a reflection off an at least partially reflective (e.g., semi-specular, matte) layer disposed on the exterior surface of the elastomeric pad. The light reflected from the elastomeric pad may be received at a photosensitive detector physically and/or visually oriented toward to the interior surface of the transparent structure. As shown in FIG. 8, in block 356 light from the second fluorescent layer that is incident on the first fluorescent layer is absorbed at the first fluorescent layer. Likewise, in block 356, light from the first fluorescent layer that is incident on the second fluorescent layer is absorbed at the second fluorescent layer. Accordingly, the first fluorescent layer and second fluorescent layer may inhibit light emitted from each fluorescent layer from being reflected back into the transparent structure.

Examples of robotic fingers constructed according to exemplary embodiments described herein, their applications, and relevant theory is discussed below.

Exemplary Manufacturing Process

The manufacturing process of a robotic finger including a retrographic sensor may include several simple and rapid prototyping techniques including 3D modeling and printing, laser cutting, spray painting, to just name a few. In some embodiments, a retrographic sensor like that of FIG. 5 may be included as a part of a robotic finger configured to dig through granular materials. The robotic finger may include a sensing module and a vibration module. The robotic finger's sensing module's core is shaped like a cylindrical wedge. A piece of optically clear acrylic tube with inner diameter of 16 mm and an outer diameter of 22 mm may be employed. The tube may be first diagonally cut using a band saw. The top and bottom surfaces of the cut tube may then be sanded and polished smooth. The bottom surface of the tube may then be painted with red and green fluorescent paint. Afterwards, 3D printing may be employed to print two housings (top and bottom) to house the components of the robotic finger (e.g., cameras, LEDs, mirror, gel boundaries). A thin piece of mirror may be cut in shape of an ellipse using a laser cutter and attached in the center of the bottom housing using a VHB double sided tape or another suitable adhesive. Blue colored LEDs may be soldered onto a printed circuit board (PCB) that is milled from a copper plate. The PCB may have a tight fit on the top housing along with the camera. Polyurethane double-sided tape that may be used as an elastomeric pad may be coated on one side with a silicone paint base mixed with aluminum flake using an air brush. The coating may then be left to rest until dry after which the tape may be applied across the clear acrylic tube. Excess tape at the bottom of the tube may be removed using scissors. With the fluorescent paint and elastomeric pad on the acrylic tube, top and bottom housings may be assembled with the acrylic tube, thereby finishing the complete assembly of the sensing module of the robotic finger. The vibration module may be a holder for a vibrator motor which is also cylindrical in shape. This module may be attached on top of the sensing module using screws and nuts or other suitable fasteners.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A retrographic sensor comprising:
a transparent structure including an interior surface, an exterior surface, and one or more side surfaces extending between the interior surface and the exterior surface;
a transparent elastomeric pad disposed on the exterior surface of the transparent structure;
an at least partially reflective layer disposed on the transparent elastomeric pad such that the transparent elastomeric pad is disposed between the at least partially reflective layer and the transparent structure; and
a first fluorescent layer disposed on at least a first side surface of the one or more side surfaces, wherein the first fluorescent layer is configured to emit first fluorescent light into the transparent structure.

2. The retrographic sensor of claim 1, further comprising one or more excitation light sources configured to direct excitation light onto the first fluorescent layer to cause the first fluorescent layer to emit the first fluorescent light.

3. The retrographic sensor of claim 2, wherein the transparent structure and transparent elastomeric pad do not fluoresce under the excitation light.

4. The retrographic sensor of claim 2, wherein the excitation light has a dominant wavelength between 200 and 500 nm.

5. The retrographic sensor of claim 2, wherein the one or more excitation light sources are configured to emit the excitation light towards an interior surface of the first fluorescent layer.

6. The retrographic sensor of claim 2, wherein the one or more excitation light sources configured to emit the excitation light towards an exterior surface of the first fluorescent layer.

7. The retrographic sensor of claim 1, wherein the first fluorescent layer has an emission wavelength band overlapping with a reflection wavelength band in which the first fluorescent layer reflects light.

8. The retrographic sensor of claim 7, wherein the emission wavelength band of the first fluorescent layer is the same as the reflection wavelength band in which the first fluorescent layer reflects light.

9. The retrographic sensor of claim 1, further comprising a second fluorescent layer disposed on at least a second side surface of the one or more side surfaces, wherein the second fluorescent layer is configured to emit second fluorescent light into the transparent structure, and wherein the first fluorescent light and the second fluorescent light have different wavelength bands.

10. The retrographic sensor of claim 9, wherein the wavelength band of the first fluorescent light and the wavelength band of the second fluorescent light are substantially non-overlapping.

11. A retrographic sensor comprising:
a transparent structure including an interior surface, an exterior surface, a first side surface extending between the interior surface and the exterior surface, and a second side surface extending between the interior surface and the exterior surface;
a transparent elastomeric pad disposed on the exterior surface of the transparent structure;
a first fluorescent layer disposed on the first side surface, wherein the first fluorescent layer is configured to emit a first fluorescent light in a first emission wavelength band into the transparent structure; and
a second fluorescent layer disposed on the second side surface, wherein the second fluorescent layer is configured to emit a second fluorescent light in a second emission wavelength band into the transparent structure, wherein the first fluorescent layer is configured to absorb the second fluorescent light that is incident on the first fluorescent layer, and wherein the second fluorescent layer is configured to absorb the first fluorescent light that is incident on the second fluorescent layer.

12. The retrographic sensor of claim 11, wherein the first emission wavelength band and the second emission wavelength band are substantially non-overlapping.

13. The retrographic sensor of claim 11, wherein the first side surface and the second side surface oppose one another.

14. The retrographic sensor of claim 11, further comprising one or more excitation light sources configured to direct excitation light onto the first fluorescent layer and the second fluorescent layer to cause the first fluorescent layer to emit the first fluorescent light and the second fluorescent layer to emit the second fluorescent light.

15. The retrographic sensor of claim 14, wherein the one or more excitation light sources are configured to emit the excitation light towards an interior surface of the first fluorescent layer and an interior surface of the second fluorescent layer.

16. The retrographic sensor of claim 14, wherein the one or more excitation light sources configured to emit the excitation light towards an exterior surface of the first fluorescent layer and an exterior surface of the second fluorescent layer.

17. The retrographic sensor of claim 14, wherein the transparent structure and transparent elastomeric pad do not fluoresce under the excitation light.

18. The retrographic sensor of claim 14, wherein the excitation light has a dominant wavelength between 200 and 500 nm.

19. The retrographic sensor of claim 11, further comprising an at least partially reflective layer disposed on the transparent elastomeric pad such that the transparent elastomeric pad is disposed between the at least partially reflective layer and the transparent structure.

20. A method of operating a retrographic sensor, comprising:
illuminating a fluorescent layer disposed on a side surface of a transparent structure with an excitation light source;
emitting a first fluorescent light from the fluorescent layer into the transparent structure toward a transparent elastomeric pad disposed on an exterior surface of the transparent structure;
reflecting the first fluorescent light off of an exterior surface of the elastomeric pad toward an interior surface of the transparent structure; and
receiving light reflected from the exterior surface of the elastomeric pad at a photosensitive detector.

* * * * *